United States Patent
Ono et al.

(10) Patent No.: US 8,737,179 B2
(45) Date of Patent: May 27, 2014

(54) OPTICAL DISC DEVICE

(71) Applicant: Funai Electric Co., Ltd., Osaka (JP)

(72) Inventors: Takayuki Ono, Osaka (JP); Masaki Mataga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/892,399

(22) Filed: May 13, 2013

(65) Prior Publication Data

US 2013/0315046 A1    Nov. 28, 2013

(30) Foreign Application Priority Data

May 22, 2012    (JP) ................................. 2012-116418

(51) Int. Cl.
*G11B 7/00*    (2006.01)
(52) U.S. Cl.
USPC ..................................... 369/44.32; 369/47.53
(58) Field of Classification Search
None
See application file for complete search history.

(56) References Cited

U.S. PATENT DOCUMENTS

| | | | |
|---|---|---|---|
| 2004/0017743 A1* | 1/2004 | Sasaki et al. | 369/44.32 |
| 2006/0114793 A1* | 6/2006 | Tonami | 369/112.01 |
| 2007/0070843 A1* | 3/2007 | Kobayashi | 369/47.36 |
| 2008/0062833 A1* | 3/2008 | Oyama et al. | 369/53.12 |
| 2009/0122663 A1* | 5/2009 | Kondo et al. | 369/44.32 |
| 2009/0290456 A1* | 11/2009 | Futakuchi et al. | 369/44.23 |
| 2010/0054094 A1* | 3/2010 | Amano | 369/44.25 |
| 2010/0322051 A1 | 12/2010 | Nabeta | |
| 2011/0075540 A1* | 3/2011 | Horibata | 369/83 |
| 2011/0235482 A1* | 9/2011 | Kanatake et al. | 369/44.32 |

FOREIGN PATENT DOCUMENTS

JP    2011-003254 A    1/2011

* cited by examiner

*Primary Examiner* — Thang Tran
(74) *Attorney, Agent, or Firm* — Global IP Counselors, LLP

(57) ABSTRACT

An optical disc device includes an optical pickup and a controller. The optical pickup is configured to emit light to an optical disc and detect the light reflected on the optical disc. The controller is configured to perform adjustment of at least one of spherical aberration, focus balance and lens tilt of the optical pickup based on a reproduction signal corresponding to the light detected by the optical pickup. The controller is further configured to perform the adjustment based on a level of the reproduction signal of adjustment-use recording. The controller is further configured to perform re-adjustment after performing subsequent adjustment-use recording in response to the level of the reproduction signal of the adjustment-use recording being at or below a specific threshold after the adjustment.

10 Claims, 4 Drawing Sheets

OPTICAL DISC DEVICE

CROSS-REFERENCE TO RELATED APPLICATIONS

This application claims priority to Japanese Patent Application No. 2012-116418 filed on May 22, 2012. The entire disclosure of Japanese Patent Application No. 2012-116418 is hereby incorporated herein by reference.

BACKGROUND

1. Field of the Invention

The present invention generally relates to an optical disc device. More specifically, the present invention relates to an optical disc device having an optical pickup.

2. Background Information

Optical disc devices having an optical pickup are known in the past (see Japanese Laid-Open Patent Application Publication No. 2011-3254 (Patent Literature 1), for example).

The above-mentioned Patent Literature 1 discloses a recording and reproduction device (optical disc device) having an optical pickup that emits light at an optical disc and detects light reflected by the optical disc, and a system controller (controller) that performs adjustment of the spherical aberration of the optical pickup based on a reproduction data signal (reproduction signal) corresponding to the light detected by the optical pickup. With this recording and reproduction device, the system controller writes test writing data (adjustment-use recording) to the optical disc, and performs adjustment of the spherical aberration of the optical pickup based on the reproduction data signal of the test writing data.

SUMMARY

However, it has been discovered that, with the recording and reproduction device (optical disc device) in the above-mentioned Patent Literature 1, if the test writing data (adjustment-use recording) is written in an initial state in which the spherical aberration of the optical pickup has not been adjusted, it is impossible to write a reproduction data signal (reproduction signal) of a sufficiently high level as the test writing data (adjustment-use recording). If this happens, it will be harder to adjust the spherical aberration of the optical pickup due to the low level of the reproduction signal of the test writing data. Thus, it is difficult to accurately adjust the spherical aberration of the optical pickup. Also, when this happens, the adjustment of the focus balance or the adjustment of lens tilt is also difficult to perform accurately.

One object of the present disclosure is to provide an optical disc device with which the adjustment of the spherical aberration of an optical pickup, the adjustment of focus balance, and the adjustment of lens tilt can be performed accurately.

In view of the state of the know technology, an optical disc device includes an optical pickup and a controller. The optical pickup is configured to emit light to an optical disc and detect the light reflected on the optical disc. The controller is configured to perform adjustment of at least one of spherical aberration, focus balance and lens tilt of the optical pickup based on a reproduction signal corresponding to the light detected by the optical pickup. The controller is further configured to perform the adjustment based on a level of the reproduction signal of adjustment-use recording. The controller is further configured to perform re-adjustment after performing subsequent adjustment-use recording in response to the level of the reproduction signal of the adjustment-use recording being at or below a specific threshold after the adjustment.

Other objects, features, aspects and advantages of the present disclosure will become apparent to those skilled in the art from the following detailed description, which, taken in conjunction with the annexed drawings, discloses a preferred embodiment of an optical disc device.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
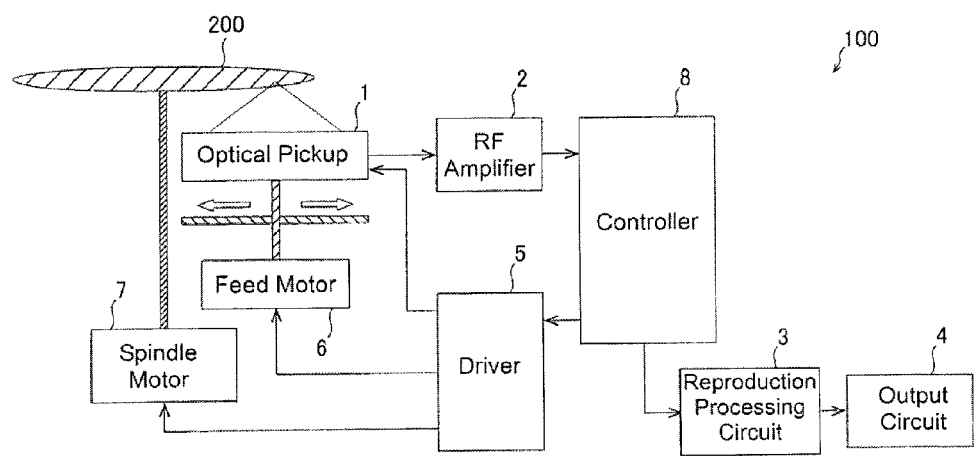
FIG. 1 is a simplified block diagram of an overall configuration of an optical disc device in accordance with one embodiment.

Referring initially to FIG. 1, an optical disc device 100 is illustrated in accordance with one embodiment.

The optical disc device 100 in this embodiment is able to reproduce a BD (Blue-ray Disc) as an optical disc 200. More specifically, the optical disc device 100 includes an optical pickup 1, an RF amplifier 2, a reproduction processing circuit 3, and an output circuit 4. The optical disc device 100 is further provided with a driver 5, a feed motor 6, a spindle motor 7, and a controller 8.

The optical pickup 1 has the function of reading various kinds of information (audio information, video information, etc.) recorded to the optical disc 200 by emitting a laser beam (light) at the optical disc 200 and detecting light reflected by the optical disc 200. The optical pickup 1 is also able to emit a blue laser beam with a wavelength of 405 nm for BD use at the optical disc 200. The configuration of the optical pickup 1 will be discussed in detail below.

The RF amplifier 2 has the function of amplifying reproduction signals based on various kinds of information read by the optical pickup 1. The reproduction processing circuit 3 acquires the reproduction signals amplified by the RF amplifier 2 via the controller 8, and subjects these reproduction signals to various kinds of processing for reproduction (such as image processing). The output circuit 4 subjects the signals that have undergone processing by the reproduction processing circuit 3 to D/A conversion processing in order to output video and audio recorded to the optical disc 200 on a monitor and from a speaker (not shown), respectively.

The driver 5 controls the operation of the feed motor 6 and the spindle motor 7 based on instructions from the controller 8. The driver 5 also controls the operation of an actuator 20 and BEX (beam expander) motor 21 (discussed below; see FIG. 2) provided inside the optical pickup 1, based on instructions from the controller 8. The feed motor 6 has the function of moving the optical pickup 1 in the radial direction of the optical disc 200. The spindle motor 7 has the function of rotating the optical disc 200.

The controller 8 produces focus error (FE) signals and tracking error (TE) signals based on the reproduction signals outputted from a light detector 19 (discussed below; see FIG. 2) provided inside the optical pickup 1. The controller 8 also performs focus servo control based on FE signals and performs tracking servo control based on TE signals during reproduction of the optical disc 200. The controller 8 also performs adjustment of the spherical aberration of the optical pickup 1, adjustment of focus balance, and adjustment of lens tilt based on the reproduction signals outputted from the light detector 19 prior to recording and reproduction of the optical disc 200. The phrase "prior to recording and reproduction of the optical disc 200" refers to a point before the optical disc 200 is reproduced or before recording is performed o the optical disc 200, such as immediately after the optical disc 200 is inserted into the optical disc device 100. The controller 8 is also able to adjust the spherical aberration of the optical pickup 1, adjust the focus balance, and adjust the lens tilt at a specific timing based on a change in the ambient temperature of the optical disc device 100, not just prior to reproduction, but also after reproduction has started.

Next, the configuration of the optical pickup 1 of the optical disc device 100 in this embodiment will be described in detail through reference to FIG. 2.

Figure 2:
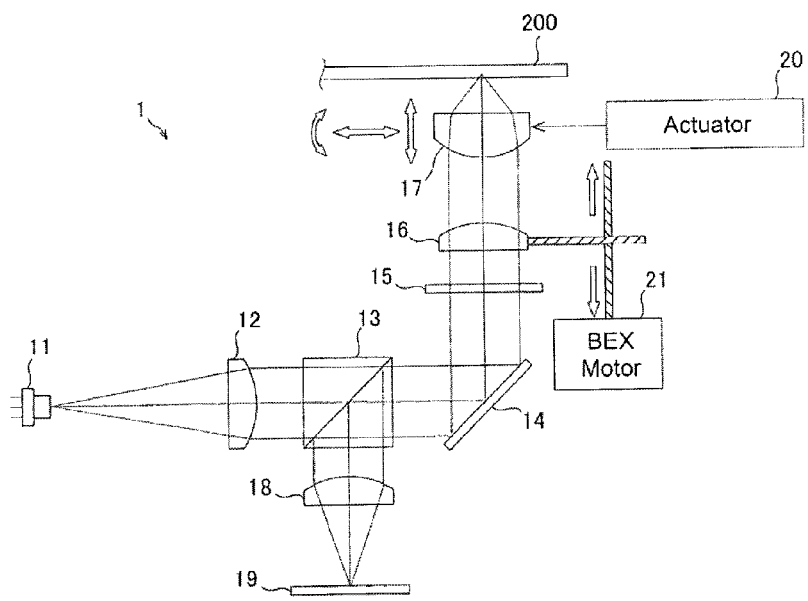
FIG. 2 is a simplified block diagram of an overall configuration of an optical pickup in the optical disc device illustrated in FIG. 1.

As shown in FIG. 2, the optical pickup 1 is provided with a light source 11, a cylindrical lens 12, a beam splitter 13, a mirror 14, a quarter wavelength plate 15, a collimator lens 16, an object lens 17, a detecting lens 18, the light detector 19, the actuator 20, and the BEX motor 21. The collimator lens 16 is an example of the "lens" of the present application.

The light source 11 includes a laser diode capable of emitting a blue laser beam with a wavelength of 405 nm. The cylindrical lens 12 has the function of converting the laser beam emitted from the light source 11 into parallel light. The beam splitter 13 functions as a light separating element that separates an incident laser beam. The beam splitter 13 transmits the laser beam arriving from the cylindrical lens 12 side to the mirror 14 side, and reflects light reflected by the optical disc 200 and arriving from the mirror 14 side to the light detector 19 side.

The mirror 14 reflects the laser beam arriving from the beam splitter 13 side to the optical disc 200 side, and reflects light reflected by the optical disc 200 and arriving from the optical disc 200 side to the beam splitter 13 side. The mirror 14 is provided at a 45-degree angle to the optical axis of the laser beam arriving from the beam splitter 13 side, and reflects the laser beam arriving from the beam splitter 13 side in a direction that is substantially perpendicular to the recording side of the optical disc 200.

The quarter wavelength plate 15 has the function of converting linear polarized light into circular polarized light, and converting circular polarized light into linear polarized light. The quarter wavelength plate 15 converts the laser beam of linear polarized light arriving from the mirror 14 side into circular polarized light and guides this light to the collimator lens 16, and converts the laser beam of circular polarized light reflected by the optical disc 200 into linear polarized light and guides this light to the mirror 14.

The collimator lens 16 is moved by the BEX motor 21 in the optical axis direction (a direction perpendicular to the recording side of the optical disc 200). When the collimator lens 16 moves in the optical axis direction, the result is that the laser beam transmitted by the collimator lens 16 becomes scattered light or focused light. This adjusts the spherical aberration of the optical pickup 1.

The object lens 17 has the function of converging the laser beam arriving from the collimator lens 16 side on the recording side of the optical disc 200. The object lens 17 can be moved by the actuator 20 in the radial direction of the optical disc 200 and in a direction perpendicular to the recording side of the optical disc 200, and its position is moved by focus servo control and tracking servo control. The inclination (tilt) of the object lens 17 can also be varied by the actuator 20. This adjusts the tilt of the object lens 17.

The light reflected by the optical disc 200 reaches the detecting lens 18 via the object lens 17, the collimator lens 16, the quarter wavelength plate 15, the mirror 14, and the beam splitter 13. The detecting lens 18 then converges the light reflected by the optical disc 200 on a light receiving element provided on the light detector 19.

The light detector 19 has the function of converting optical information received using a photodiode or other such light receiving element into an electrical signal, and outputting this electrical signal to the controller 8 (see FIG. 1).

The actuator 20 moves the object lens 17 in the radial direction of the optical disc 200 based on an object lens drive signal produced by the driver 5 (see FIG. 1). Consequently, a tracking operation is executed. The actuator 20 also moves the object lens 17 in a direction perpendicular to the recording side of the optical disc 200 based on an object lens drive signal produced by the driver 5. Consequently, a focus operation is executed. The actuator 20 also varies the inclination (tilt) of the object lens 17 based on an object lens drive signal produced by the driver 5.

The electrical signal outputted from the light detector 19 to the controller 8 is used to produce focus error (FE) signals and tracking error (TE) signals. The controller 8 produces FE signals and TE signals by performing computation processing using the electrical signals from the light detector 19. More specifically, the controller 8 produces FE signals and TE signals by astigmatic method using the electrical signals from the light detector 19.

In this embodiment, the controller 8 (see FIG. 1) adjusts the spherical aberration of the optical pickup 1 based on a reproduction signal corresponding to the laser beam (light) reflected by the optical disc 200 and detected by the optical pickup 1. More specifically, the controller 8 performs adjustment-use recording (e.g., test recording) in an unrecorded region of the optical disc 200, and adjusts the spherical aberration based on the level of the reproduction signal of the adjustment-use recording. Specifically, the reproduction signal of the adjustment-use recording means the reproduction signal obtained by reproducing the adjustment-use recording of the optical disc 200. The controller 8 also performs re-adjustment after performing another adjustment-use recording again when the level of the adjusted reproduction signal is at or below a specific threshold (such as a target level of 35% or less). Control in which adjustment-use recording is performed in an unrecorded region of the optical disc 200 and the spherical aberration is adjusted based on the level of the reproduction signal of the adjustment-use recording is carried out when the optical disc 200 is in an unrecorded state (when it is new or blank).

Figure 3:
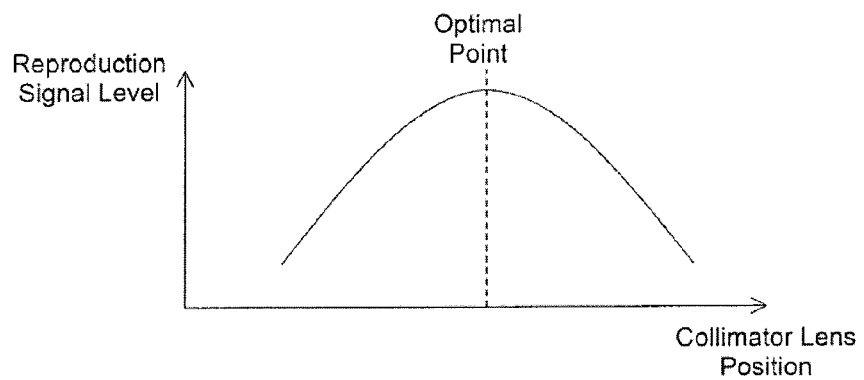
FIG. 3 is a graph of the relation between reproduction signal level and collimator lens position in the optical disc device illustrated in FIG. 1.
Figure 4:
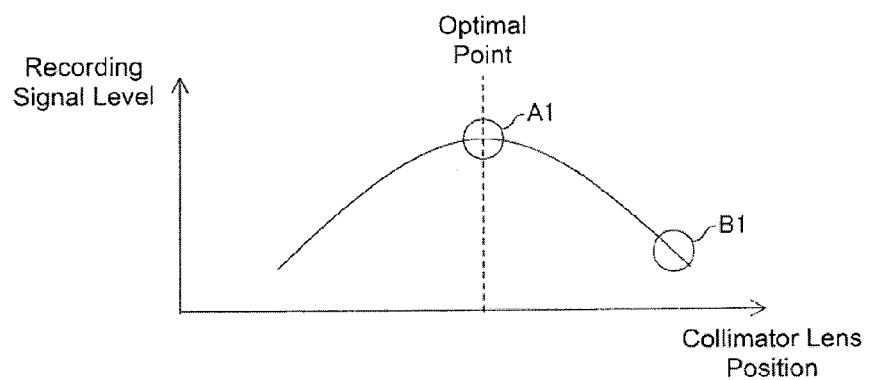
FIG. 4 is a graph of the relation between recording signal level and the collimator lens position in the optical disc device illustrated in FIG. 1.

As shown in FIG. 3, the level of the reproduction signal fluctuates with the position of the collimator lens 16. As shown in FIG. 4, the level of the recording signal fluctuates with the position of the collimator lens 16 just as the level of the reproduction signal does. That is, the level of the reproduction signal and the level of the recording signal fluctuate when the spherical aberration is adjusted. The positions of the collimator lens 16 at which the level of the reproduction signal and the level of the recording signal reach their maximum are known to be about the same positions. That is, the spherical aberration can be adjusted both during reproduction and during recording by adjusting the spherical aberration based on the level of the reproduction signal.

Figure 5:
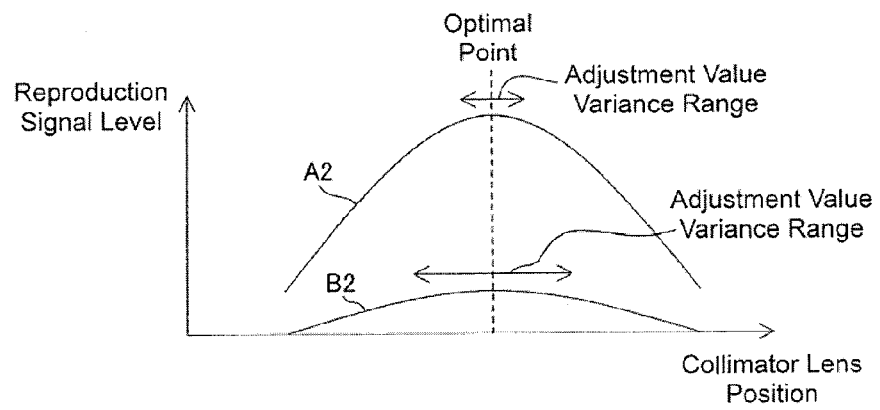
FIG. 5 is a graph illustrating the difference in reproduction signal levels in the optical disc device illustrated in FIG. 1.

When adjustment-use recording is performed at the position of the collimator lens 16 near the optimal point (e.g., A1 in FIG. 4) at which the level of the recording signal is highest, the level of the reproduction signal is relatively high and has a peaked shape with distinct maximum point (optimal point), as shown by A2 in FIG. 5. On the other hand, when adjustment-use recording is performed at the position of the collimator lens 16 where the level of the recording signal is relatively low (B1 in FIG. 4), the level of the reproduction signal is relatively low and has an overall flattened peak shape, as shown by B2 in FIG. 5. As a result, when adjustment is performed so as to maximize the level of the reproduction signal of the adjustment-use recording, if adjustment error is taken into account, in the case of A2 the range of variance of the adjustment value is relatively narrow, and in the case of B2 the range of variance of the adjustment value is relatively wide. That is, adjustment can be performed more accurately when the level of the reproduction signal (the level of the recording signal) is higher. More specifically, the position of the collimator lens 16 can be adjusted to be closer to the optimal point when the level of the reproduction signal (the level of the recording signal) is higher.

Figure 7:
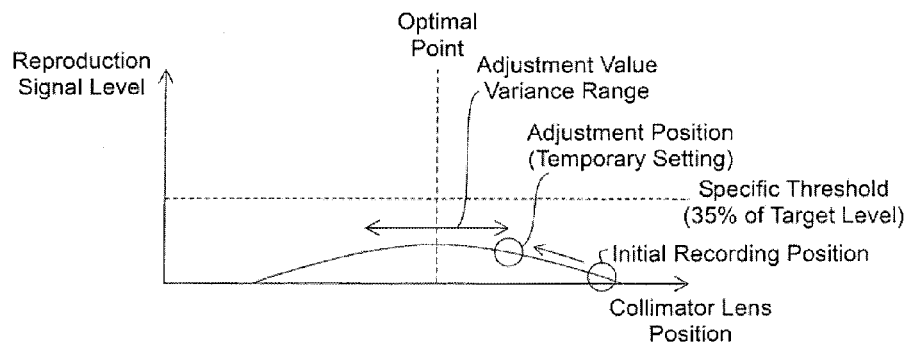
FIG. 7 is a graph illustrating temporarily set reproduction signal level in the optical disc device illustrated in FIG. 1.
Figure 8:
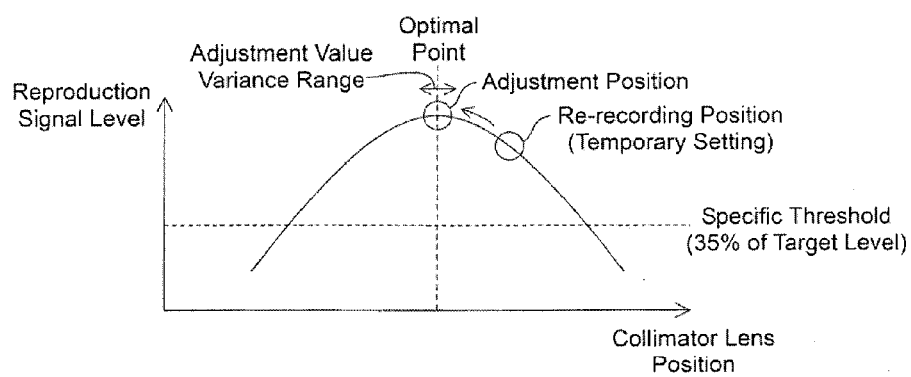
FIG. 8 is a graph illustrating re-adjusted reproduction signal level in the optical disc device illustrated in FIG. 1.

As shown in FIGS. 7 and 8, when the spherical aberration is adjusted, the controller 8 moves the collimator lens 16 from its position where the adjustment-use recording has been performed so that the level of the reproduction signal increases. The controller 8 then adjusts the position of the collimator lens 16 by aiming for the position at which the level of the reproduction signal of the adjustment-use recording is at its maximum. In actual practice, however, because of adjustment error, the position of the collimator lens 16 is adjusted to be near the point where the level of the reproduction signal is at its maximum (the variance range of the adjustment value).

When the level of the reproduction signal of the adjustment-use recording is at or below a specific threshold (35% of the target level or lower), the controller 8 temporarily sets the adjustment result at this point, and performs adjustment-use recording again so that the level of the reproduction signal will increase based on the temporary setting. More specifically, when the level of the adjusted reproduction signal is at or below a specific threshold (35% of the target level or lower), as in the example shown in FIG. 7, that the position of the collimator lens 16 is temporarily set as the temporary adjustment position by the controller 8. After this, as in the example shown in FIG. 8, the controller 8 performs re-adjustment of the position of the collimator lens 16 after performing adjustment-use recording again at the temporary adjustment position. The target level of the reproduction signal is the level of the reproduction signal preset as the target in the optical disc device 100. The reproduction signal can be read as long as the level of the reproduction signal is more than 20% of the target level.

Also, when the level of the reproduction signal of the adjustment-use recording after adjustment is at or below a specific threshold (35% of the target level or lower), the controller 8 performs re-adjustment after performing adjustment-use recording again in a different unrecorded region from the region of the optical disc 200 in which the adjustment-use recording has already been recorded. That is, the adjustment-use recordings are performed in the unrecorded region at the time of both the first recording and re-recording.

Next, processing for adjusting the spherical aberration performed by the controller 8 of the optical disc device 100 in this embodiment will be described through reference to FIG. 6. This processing is executed prior to recording and reproduction of the optical disc 200, such as immediately after an unrecorded (new or blank) optical disc 200 is inserted into the optical disc device 100.

Figure 6:
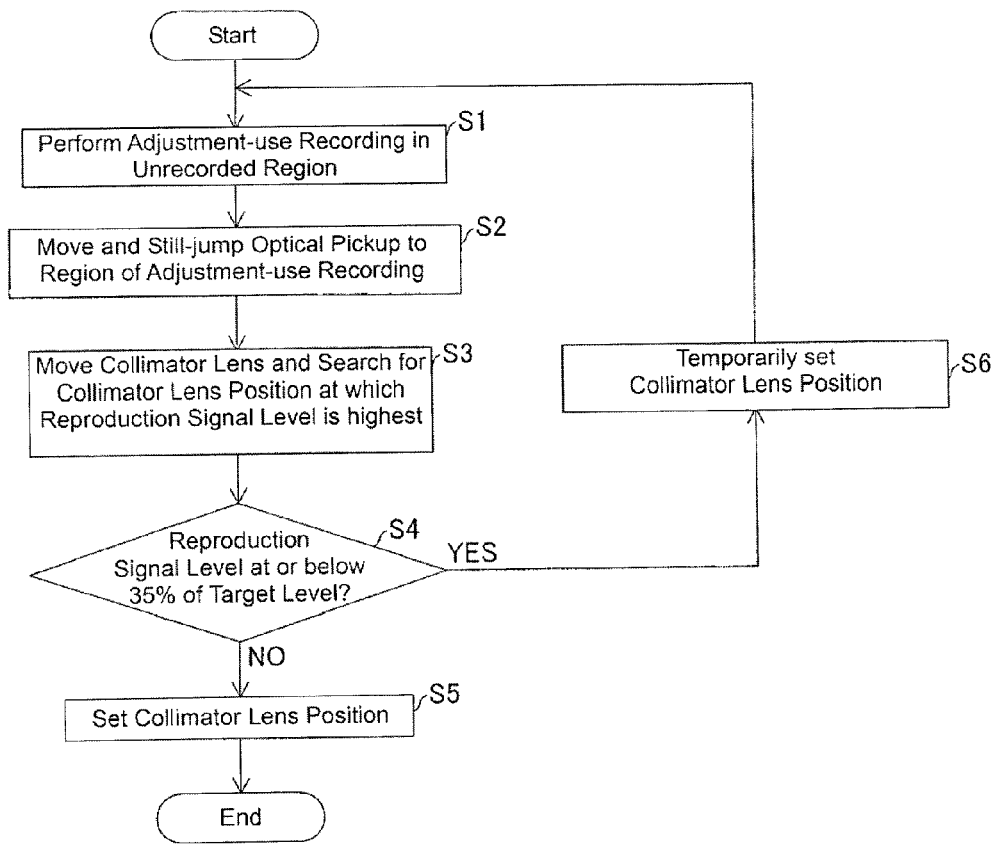
FIG. 6 is a flowchart illustrating processing for adjustment of spherical aberration of the optical pickup by a controller of the optical disc device illustrated in FIG. 1.

In step S1 in FIG. 6, the controller 8 performs adjustment-use recording in the unrecorded region of the optical disc 200. In step S2 the controller 8 moves the optical pickup 1 to the region of the optical disc 200 where the adjustment-use recording has been performed. The controller 8 also still jumps the optical pickup 1 and holds the optical pickup 1 in the region where the adjustment-use recording has been performed. That is, the controller 8 causes the optical pickup 1 jump the track rather than following the track, and thereby keeps the optical pickup 1 in the region where the adjustment-use recording was performed.

In step S3 the controller 8 moves the collimator lens 16 and searches for the position of the collimator lens 16 at which the level of the reproduction signal is highest. More specifically, as in the example shown in FIGS. 7 and 8, the controller 8 moves the collimator lens 16 so that the level of the reproduction signal of the adjustment-use recording will be higher, and adjusts the position of the collimator lens 16 to the position where the level of the reproduction signal is at its maximum.

In this embodiment, in step S4 the controller 8 determines whether or not the adjusted level of the reproduction signal is at or below 35% of the target level. If the level is over 35%, the flow proceeds to step S5. On the other hand, if it is at or below 35%, the flow proceeds to step S6. The controller 8 in step S5 sets the position of the collimator lens 16 to the current position, and sets the adjustment of the spherical aberration. After this, the spherical aberration adjustment processing is ended.

In step S4, if the level of the reproduction signal is determined to be at or below 35% of the target level, the controller 8 in step S6 temporarily sets the position of the collimator lens 16 (see FIG. 7). The flow then returns to step S1. Upon returning to step S1, the controller 8 moves the collimator lens 16 to the temporary setting position (see FIG. 8), and performs another adjustment-use recording again in a different unrecorded region from the region of the optical disc 200 in which the adjustment-use recording has already been performed. The controller 8 then repeats steps S1 to S4 and S6 until the level of the reproduction signal is greater than 35% of the target level. That is, the controller 8 repeats control to perform re-adjustment after performing adjustment-use recording again until the level of the reproduction signal of the adjustment-use recording after adjusting is greater than a specific threshold (35% of the target level).

In the illustrated embodiment, the optical disc device 100 includes the optical pickup 1 that emits light to the optical disc 200 and detects light reflected on the optical disc 200, and the controller 8 that performs adjustment of the spherical aberration of the optical pickup 1 (e.g., at least one of adjustment of the spherical aberration of the optical pickup 1, adjustment of the focus balance of the optical pickup 1, and adjustment of the lens tilt of the optical pickup 1) based on the reproduction signal corresponding to the light detected by the optical pickup 1. The controller performs the adjustment based on the level of the reproduction signal of adjustment-use recording. The controller performs re-adjustment after performing adjustment-use recording again (e.g., subsequent adjustment—use recording) when the level of the adjusted reproduction signal after the adjustment is at or below a specific threshold.

In this embodiment, as discussed above, the controller 8 is provided to perform the adjustment based on the level of the reproduction signal of the adjustment-use recording, and to perform re-adjustment after performing another adjustment-use recording again (e.g., subsequent adjustment-use recording) when the level of the adjusted reproduction signal is at or below a specific threshold (35% of the target level) after the adjustment. As a result, the level of the reproduction signal of the adjustment-use recording can be adjusted so that it increases. Thus, the adjustment of the spherical aberration of the optical pickup 1 can be performed accurately based on the level of the reproduction signal of the adjustment-use recording, which has been adjusted to a higher level.

Also, in this embodiment, when the optical disc 200 is in an unrecorded state, the controller 8 performs the adjustment-use recording to the optical disc 200. The controller 8 also performs the adjustment based on the level of the reproduction signal of the adjustment-use recording, and performs the re-adjustment after performing another adjustment-use recording again (e.g., subsequent adjustment-use recording) when the level of the adjusted reproduction signal is at or below a specific threshold (35% or less of the target level) after the adjustment. Thus, the level of the reproduction signal of the adjustment-use recording can be adjusted higher even with a new optical disc 200 in an unrecorded state. Therefore, the adjustment of the spherical aberration of the optical pickup 1 with respect to the optical disc 200 in an unrecorded state can be carried out accurately based on the level of the reproduction signal of the adjustment-use recording.

Also, in this embodiment, when the level of the reproduction signal of the adjustment-use recording is at or below a specific threshold (35% or less of the target level), the controller 8 temporarily sets an adjustment result of the adjustment at this point as a temporary setting. The controller 8 also performs the adjustment-use recording again (e.g., subsequent adjustment-use recording) based on the temporary setting so that the level of the reproduction signal will increase. As a result, the level of the reproduction signal when the adjustment-use recording is performed again (e.g., subsequent adjustment-use recording) can be easily adjusted higher than the level of the temporarily set reproduction signal. Therefore, the spherical aberration of the optical pickup 1 can be easily and accurately adjusted based on the increased or raised level of the reproduction signal of the adjustment-use recording.

Also, in this embodiment, the controller 8 performs the adjustment and the re-adjustment so that the levels of the reproduction signals of the adjustment-use recordings (e.g., the adjustment-use recording and the subsequent adjustment-use recording) will be at their maximum during both the first adjustment and the re-adjustment. Thus, the adjustment can be performed so that the level of the reproduction signal can be easily increased.

Also, in this embodiment, when the level of the reproduction signal of the adjustment-use recording after the adjustment is at or below a specific threshold (35% or less of the target level), the controller 8 performs the re-adjustment after performing the adjustment-use recording again (e.g., subsequent adjustment-use recording) in an unrecorded region of the optical disc that is different from a region in which the adjustment-use recording has already been performed. This allows the re-adjustment to be performed after performing the adjustment-use recording again even on a write-once type of optical disc 200.

Also, in this embodiment, the controller 8 repeats control that performs the adjustment-use recording again (e.g., subsequent adjustment-use recording) and the re-adjustment after performing the adjustment-use recording again (e.g., re-adjustment subsequent to the subsequent adjustment-use recording), until the level of the reproduction signal of the adjustment-use recording after adjustment (e.g., subsequent adjustment-use recording) is higher than a specific threshold (35% or less of the target level). This allows the adjustment of spherical aberration of the optical pickup to be performed more accurately based on a reproduction signal having a level reliably higher than a specific threshold (35% of the target level).

Also, in this embodiment, the controller 8 performs control that adjusts the position of the collimator lens 16 when the adjustment of the spherical aberration of the optical pickup 1 (e.g., adjustment of one of the spherical aberration and the lens tilt of the optical pickup 1) is performed. This allows the spherical aberration of the optical pickup 1 to be accurately adjusted by adjusting the position of the collimator lens 16.

Also, in this embodiment, the controller 8 moves the optical pickup 1 to a region of the optical disc 200 in which the adjustment-use recording has been performed in response to performing the adjustment-use recording. The controller 8 further performs adjustment of the position of the collimator lens 16 to a position at which the level of the reproduction signal of the adjustment-use recording becomes maximum while holding the optical pickup 1 in the region of the optical disc 200. The controller 8 further determines if the level of the reproduction signal of the adjustment-use recording is at or below the specific threshold after the adjustment of the position of the collimator lens 16.

The embodiment disclosed herein is just an example in all respects, and should not be construed as being limiting in nature. The scope of the present invention is indicated by the patent claims and not the description of the embodiment above, and furthermore encompasses all modifications within a meaning and scope equivalent to the patent claims.

For instance, in the above embodiment an example was given of applying the present application to an optical disc device compatible with BD. However, the present application is not limited to this. The present application can be applied instead to an optical disc device compatible with CD (compact disc) or DVD (digital versatile disc), or can be applied to optical disc devices other than CD, DVD, and BD. The present application can also be applied to optical disc devices compatible with a plurality of types of medium, such as CD, DVD, and BD.

Also, in the above embodiment, an example was given in which, when the spherical aberration of the optical pickup was adjusted, adjustment-use recording was performed on the optical disc, adjustment was performed based on the reproduction signal of the adjustment-use recording, and if the level of the adjusted reproduction signal was at or below a specific threshold, re-adjustment was performed after performing adjustment-use recording again. However, the present application is not limited to or by this. With the present application, when at least one of the adjustment of the spherical aberration of the optical pickup, the adjustment of focus balance, and the adjustment of lens tilt is performed, adjustment-use recording is performed to the optical disc, adjustment is performed based on the level of the reproduction signal of the adjustment-use recording, and if the level of the adjusted reproduction signal is at or below a specific threshold, re-adjustment is performed after performing adjustment-use recording again. With this configuration, the adjustment of the spherical aberration of the optical pickup, the adjustment of the focus balance, and the adjustment of the lens tilt can be performed accurately based on the raised level of the reproduction signal for adjustment-use recording.

Furthermore, when the level of the reproduction signal of adjustment-use recording is at or below a specific threshold, the controller can temporarily set the adjustment result at this point, and perform adjustment-use recording again so that the level of the reproduction signal will increase based on the temporary setting. With this configuration, since the level of the reproduction signal when adjustment-use recording is performed again can be raised more easily than the level of the reproduction signal that was temporarily set, the adjustment of the spherical aberration of the optical pickup, the adjustment of focus balance, or the adjustment of lens tilt can be performed easily and accurately based on the raised level of the reproduction signal for adjustment-use recording, which is reliably higher than a specific threshold.

Also, when the focus balance is adjusted, the balance of the focus error (FE) signal can be adjusted based on the level of the reproduction signal. When lens tilt is adjusted, the tilt can be adjusted by moving the object lens 17 (see FIG. 2) based on the level of the reproduction signal. The object lens 17 is an example of the "lens" of the present invention. Specifically, in this embodiment, the controller 8 performs control that adjusts the position of the collimator lens 16 when the adjustment of the spherical aberration of the optical pickup 1 is performed. Furthermore, the controller 8 can perform control that adjusts the position or tilt of the object lens 17 when the adjustment of lens tilt is performed. With this configuration, the adjustment of lens tilt can be accurately performed by adjusting the position or tilt of the object lens 17.

Also, in this embodiment, an example was given in which adjustment-use recording was performed to the optical disc 200, and adjustment-use recording was performed based on the level of the reproduction signal of the adjustment-use recording, when the optical disc 200 was in an unrecorded state (new). However, the present application is not limited to or by this. With the present application, as long as it is possible to perform adjustment-use recording to the optical disc 200, the optical disc 200 can include a recorded region in which recording has been performed.

Also, in this embodiment, an example was given in which 35% of the target level was set as the specific threshold for the reproduction signal level. However, the present application is not limited to this. With the present application, some level other than 35% of the target level can be set as the target level.

Also, in this embodiment, for the sake of convenience, a flow drive type of flowchart in which the processing done by the controller of the present application is carried out sequentially along the processing flow was used in the description. However, the present application is not limited to this. With the present application, the processing operation of the controller can entail an event drive type of processing in which the processing is executed in event units. In this case, the processing can be a completely event drive type, or can be a combination of event drive and flow drive.

With the present application, as discussed above, the adjustment of the spherical aberration of the optical pickup, the adjustment of the focus balance, or the adjustment of the lens tilt can be performed accurately.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a preferred embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiment according to the present invention are provided for illustration only, and not for the purpose of limiting the invention as defined by the appended claims and their equivalents.

What is claimed is:

1. An optical disc device comprising:
    an optical pickup configured to emit light to an optical disc and detect the light reflected on the optical disc; and
    a controller configured to perform adjustment of at least one of spherical aberration, focus balance and lens tilt of the optical pickup based on a reproduction signal corresponding to the light detected by the optical pickup,
    the controller being further configured to perform the adjustment based on a level of the reproduction signal of adjustment-use recording, the controller being further configured to perform re-adjustment after performing subsequent adjustment-use recording in response to the level of the reproduction signal of the adjustment-use recording being at or below a specific threshold after the adjustment.

2. The optical disc device according to claim 1, wherein the controller is further configured to perform the adjustment-use recording to the optical disc while the optical disc is in an unrecorded state.

3. The optical disc device according to claim 1, wherein the controller is further configured to temporarily set an adjustment result of the adjustment as a temporary setting in response to the level of the reproduction signal of the adjustment-use recording being at or below the specific threshold after the adjustment, the controller being further configured to perform the subsequent adjustment-use recording based on the temporary setting such that the level of the reproduction signal increases.

4. The optical disc device according to claim 1, wherein the controller is further configured to perform the adjustment and the re-adjustment such that the levels of the reproduction signals of the adjustment-use recording and the subsequent adjustment-use recording become maximum during both the adjustment and the re-adjustment, respectively.

5. The optical disc device according to claim 1, wherein the controller is further configured to perform the re-adjustment after performing the subsequent adjustment-use recording in an unrecorded region of the optical disc in response to the level of the reproduction signal of the adjustment-use recording being at or below the specific threshold after the adjustment, the unrecorded region of the optical disc being different from a region in which the adjustment-use recording has been performed.

6. The optical disc device according to claim 1, wherein the controller is further configured to repeat the subsequent adjustment-use recording and the re-adjustment subsequent to the subsequent adjustment-use recording until the level of the reproduction signal of the subsequent adjustment-use recording becomes higher than the specific threshold after the re-adjustment.

7. The optical disc device according to claim 1, wherein the controller is further configured to perform adjustment of a position of a lens while the adjustment of one of the spherical aberration and the lens tilt of the optical pickup is performed.

8. The optical disc device according to claim 1, wherein the controller is further configured to move the optical pickup to a region of the optical disc in which the adjustment-use recording has been performed in response to performing the adjustment-use recording.

9. The optical disc device according to claim 8, wherein the controller is further configured to perform adjustment of a position of a lens to a position at which the level of the reproduction signal of the adjustment-use recording becomes maximum while holding the optical pickup in the region of the optical disc.

10. The optical disc device according to claim 9, wherein the controller is further configured to determine if the level of the reproduction signal of the adjustment-use recording is at or below the specific threshold after the adjustment of the position of the lens.

\* \* \* \* \*